(12) United States Patent
Edge

(10) Patent No.: US 9,144,054 B2
(45) Date of Patent: Sep. 22, 2015

(54) DISTRIBUTED A-GNSS POSITIONING OF STATIC DEVICES

(75) Inventor: Stephen William Edge, Escondido, CA (US)

(73) Assignee: QUALCOMM Incorporated, San Diego, CA (US)

( * ) Notice: Subject to any disclaimer, the term of this patent is extended or adjusted under 35 U.S.C. 154(b) by 592 days.

(21) Appl. No.: 13/309,476

(22) Filed: Dec. 1, 2011

(65) Prior Publication Data

US 2012/0306693 A1    Dec. 6, 2012

Related U.S. Application Data

(60) Provisional application No. 61/419,715, filed on Dec. 3, 2010.

(51) Int. Cl.
*H04W 64/00*    (2009.01)
*H04W 84/04*    (2009.01)

(52) U.S. Cl.
CPC .......... *H04W 64/003* (2013.01); *H04W 84/045* (2013.01)

(58) Field of Classification Search
USPC ........ 342/357.25, 357.29, 457; 701/468, 469; 455/456.1, 456.6
See application file for complete search history.

(56) References Cited

U.S. PATENT DOCUMENTS

| 7,084,809 B2 | 8/2006 | Hockley, Jr. et al. |
| 2004/0145519 A1 | 7/2004 | Cho |
| 2008/0220795 A1 | 9/2008 | Bose et al. |
| 2009/0264137 A1 | 10/2009 | Soliman |
| 2010/0120394 A1 | 5/2010 | Mia et al. |
| 2010/0120447 A1 | 5/2010 | Anderson et al. |
| 2010/0128709 A1 | 5/2010 | Liu et al. |
| 2010/0298008 A1 | 11/2010 | Burroughs |

FOREIGN PATENT DOCUMENTS

| JP | 2012508539 A | 4/2012 |
| WO | 2010/000695 A1 | 1/2010 |
| WO | 2010056453 A1 | 5/2010 |
| WO | 2010/127681 A1 | 11/2010 |

OTHER PUBLICATIONS

International Search Report and Written Opinion—PCT/US2011/063073—ISA/EPO—Mar. 7, 2012.

*Primary Examiner* — Dao Phan
(74) *Attorney, Agent, or Firm* — Silicon Valley Patent Group LLP

(57) ABSTRACT

Method and apparatus for determining locations of static devices are disclosed. The method includes identifying a plurality of static devices, obtaining location measurements by the plurality of static devices at different times, and determining locations of the plurality of static devices using the location measurements obtained at the different times. The method of determining locations of the plurality of static devices includes determining a group location of the plurality of static devices based on GNSS pseudo range measurements contributed by the one or more static devices, where the group location is near a centroid of the plurality of static devices weighted by the number of GNSS pseudo range measurements contributed by each of the plurality of static devices. The method of determining locations of the plurality of static devices further includes sharing a common time reference among the plurality of static devices.

37 Claims, 3 Drawing Sheets

DISTRIBUTED A-GNSS POSITIONING OF STATIC DEVICES

CROSS REFERENCE TO RELATED APPLICATIONS

This application claims the benefit of U.S. provisional application No. 61/419,715, "Distributed A-GNSS Positioning of Femtocells" filed Dec. 3, 2010. The aforementioned United States application is hereby incorporated by reference in its entirety.

FIELD

The present disclosure relates to the field of wireless communications. In particular, the present disclosure relates to a method and system for determining locations of static devices such as femtocells.

BACKGROUND

Femtocells, also known as home base stations, Home E-UTRAN Node Bs (HeNBs) and Home Node Bs (HNBs), are base stations designed to serve relatively small geographic areas and are widely deployed at various locations such as homes, offices, shops, apartments, etc. These home base stations are used to improve radio coverage, increase throughput, reduce load on a macro-cellular network, and/or provide other benefits for network operators and/or users. Unlike macro base stations that are carefully deployed at specific known locations and maintained by network operators, home base stations may be flexibly deployed in an unplanned manner at any location by users but typically use licensed radio frequencies of the network operators.

A femtocell may support communication for one or more User Equipments (UEs) within its coverage. It may be desirable to know the location of the femtocell and/or a UE communicating with the femtocell. For example, it may be necessary to know the location of the femtocell in order to ensure that it is authorized to operate at its current location (e.g., is within a geographic area for which an associated network operator has a license to use the radio frequencies supported by the femtocell). As another example, the user of a UE may place an emergency call using the femtocell. The location of the UE may then be approximated by the location of the femtocell and used to send emergency assistance to the user. There are many other scenarios in which knowledge of the location of a femtocell may be useful or necessary.

In some situations, determining femtocell positions inside buildings using assisted GPS (A-GPS) or assisted GNSS (A-GNSS) may be difficult or unreliable due to lack of enough satellite vehicle (SV) signals (typically 4 or more) of sufficient strength that need to be acquired and measured by each femtocell in order to locate it. This can typically be a problem when attempting to locate a collection of femtocells (for example 3GPP HeNBs or HNBs) within a building or building complex (e.g. office building, shopping mall, hospital, hotel, apartment complex) since many of the femtocells may be deep inside the building or building complex and unable to receive many if any GPS or GNSS SV signals.

Therefore, there is a need for a method and system for determining locations of femtocells that can address the above issues.

SUMMARY

Method and apparatus for determining locations of static devices are disclosed. In one embodiment, the method includes identifying a plurality of static devices, obtaining location measurements by the plurality of static devices at different times, and determining locations of the plurality of static devices using the location measurements obtained at the different times. In some applications, the static devices are femtocells.

The method of obtaining location measurements includes one or more of obtaining GNSS pseudo range measurements for one or more satellite vehicles by one or more static devices in the plurality, obtaining Observed Time Difference Of Arrival (OTDOA) measurements for one or more fixed radio beacons, and obtaining signal propagation time from one or more fixed radio beacons to one or more static devices in the plurality.

The method of determining locations of the plurality of static devices includes determining a group location of the plurality of static devices based on GNSS pseudo range measurements contributed by the one or more static devices, where the group location is near a centroid of the plurality of static devices weighted by the number of GNSS pseudo range measurements contributed by each of the plurality of static devices. The method of determining locations of the plurality of static devices further includes sharing a common time reference among the plurality of static devices.

The method of determining locations of static devices further includes determining the relative locations of the plurality of static devices using the location measurements made by one or more static devices in the plurality of other static devices in the plurality, where the location measurements made by one or more static devices in the plurality of other static devices includes at least one of Observed Time Difference Of Arrival (OTDOA) measurements of pairs of static devices, and signal propagation times between one or more pairs of static devices in the plurality of static devices.

The method of determining locations of static devices further includes scheduling a target time for obtaining location measurements, and synchronizing location measurements by the plurality of static devices according to the target time. The target time includes at least one of a GNSS time, a local transmission time of one of the plurality of static devices, a local transmission time of a terrestrial radio beacon, and a time relative to current time.

In another embodiment, an apparatus for determining locations of static devices include one or more processors, a device positioning module, and a memory configured to store locations of the plurality of static devices. The device positioning module, working with the one or more processors, includes logic for identifying a plurality of static devices, logic for obtaining location measurements by the plurality of static devices at different times, and logic for determining locations of the plurality of static devices using the location measurements obtained at the different times.

In yet another embodiment, a computer program product for determining locations of static devices includes a non-transitory medium storing computer programs for execution by one or more computer systems. The computer program product further includes code for identifying a plurality of static devices, code for obtaining location measurements by the plurality of static devices at different times, and code for determining locations of the plurality of static devices using the location measurements obtained at the different times.

In yet another embodiment, a system for determining locations of static devices includes means for identifying a plurality of static devices, means for obtaining location measurements by the plurality of static devices at different times, and means for determining locations of the plurality of static devices using the location measurements obtained at the different times.

BRIEF DESCRIPTION OF THE DRAWINGS

The aforementioned features and advantages of the disclosure, as well as additional features and advantages thereof, will be more clearly understandable after reading detailed descriptions of embodiments of the disclosure in conjunction with the following drawings.

Like numbers are used throughout the figures.

DESCRIPTION OF EMBODIMENTS

Figure 1:
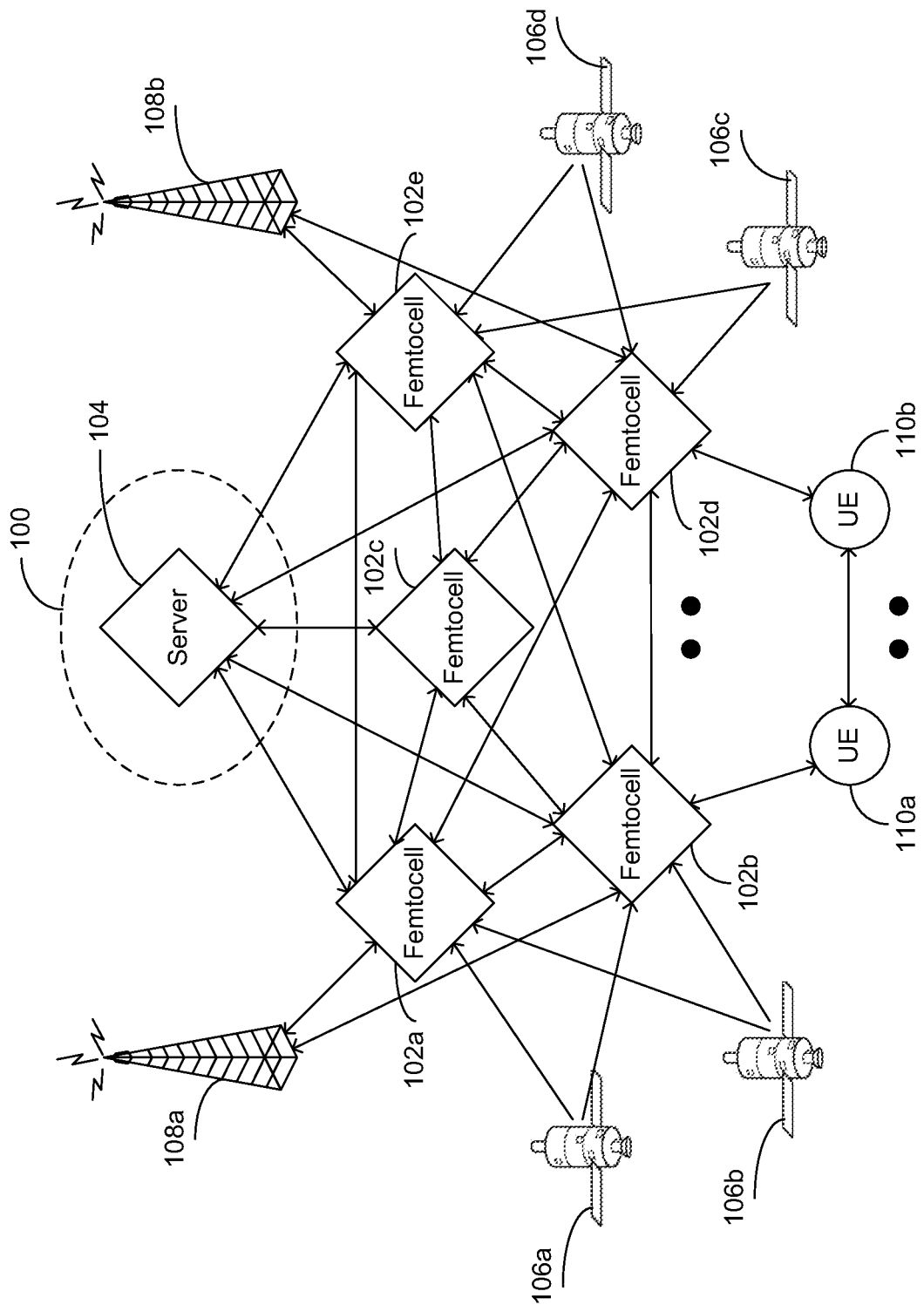
FIG. 1 illustrates an exemplary distributed A-GNSS position determination system according to some aspects of the present disclosure.

Embodiments of determining locations of femtocells are disclosed. The following descriptions are presented to enable any person skilled in the art to make and use the disclosure. Descriptions of specific embodiments and applications are provided only as examples. Various modifications and combinations of the examples described herein will be readily apparent to those skilled in the art, and the general principles defined herein may be applied to other examples and applications without departing from the spirit and scope of the disclosure. Thus, the present disclosure is not intended to be limited to the examples described and shown, but is to be accorded the widest scope consistent with the principles and features disclosed herein.

The techniques described herein for locating femtocells may be used for various wireless networks and radio technologies such as those defined by organizations named "3rd Generation Partnership Project" (3GPP) and "3rd Generation Partnership Project 2" (3GPP2). For example, the techniques may be used to locate femtocells that are part of or extend an LTE network, a Wideband Code Division Multiple Access (WCDMA) network, a CDMA 1X network, a CDMA EvDO network, a Global System for Mobile Communications (GSM) network, etc. LTE, WCDMA, and GSM are described in documents from 3GPP. CDMA 1X and CDMA EvDO are described in documents from 3GPP2. The techniques may also be used to locate femtocells for other wireless networks (e.g., other 3GPP and 3GPP2 networks) and for other radio technologies.

The techniques described herein may also be used with various user plane and control plane location solutions/architectures that can support location services. Location services refer to any services based on or related to location information. Location information may include any information related to the location of a device, e.g., a location estimate, measurements, etc. Location services may include positioning, which refers to a functionality that determines a geographical or civic location of a target device. Location services may also include activities that assist positioning such as transfer of assistance data to a UE or femtocell to assist the UE or femtocell to make location related measurements and determine its own location.

A user plane location solution is a location solution or system that sends messages for location services via a user plane. A user plane is a mechanism for carrying signaling and data for higher-layer applications and employing a user-plane bearer, which is typically implemented with standard protocols such as User Datagram Protocol (UDP), Transmission Control Protocol (TCP), and Internet Protocol (IP). A control plane location solution is a location solution that sends messages for location services via a control plane. A control plane is a mechanism for carrying signaling for higher-layer applications and is typically implemented with network-specific protocols, interfaces, and signaling messages. Messages supporting location services are carried as part of signaling in a control plane location solution and as part of traffic data (from a network perspective) in a user plane location solution. The content of the messages may, however, be the same or similar in both user plane and control plane location solutions. An example of user plane location solution includes Secure User Plane Location (SUPL) from the Open Mobile Alliance (OMA). SUPL is described in OMA Technical Specification (TS) OMA-TS-ULP-V2_0 in the case of SUPL Version 2.0 and OMA TS OMA-TS-ULP-V3_0 in the case of SUPL version 3.0, which are publicly available. Some examples of control plane location solutions include (i) a 3GPP control plane location solution described in 3GPP TS 23.271, TS 43.059, TS 25.305, and TS 36.305 and (ii) a 3GPP2 control plane location solution described in TIA IS-881 and 3GPP2 TS X.S0002.

The techniques described herein may also be used with various positioning protocols such as (i) LTE Positioning Protocol (LPP), Radio Resource LCS Protocol (RRLP), and Radio Resource Control (RRC) defined by 3GPP, (ii) C.S0022 (also known as IS-801) defined by 3GPP2, and (iii) LPP Extensions (LPPe) defined by OMA. LPP is described in 3GPP TS 36.355, RRLP is described in 3GPP TS 44.031, RRC is described in 3GPP TS 25.331, and LPPe is described in OMA TS OMA-TS-LPPe-V1_0, all of which are publicly available. A positioning protocol may be used to coordinate and control positioning of devices. A positioning protocol may define (i) procedures that may be executed by a location server and a device being positioned and (ii) communication or signaling between the device and the location server.

Positioning of a single entity, for example a wireless terminal or some other mobile device, using the United States Global Positioning System (GPS) or some other Global Navigation Satellite System (GNSS) such as the Russian Glonass system, the European Galileo system or the Chinese Compass system, is a well established capability. The mobile device begins by acquiring and then measuring signals for a number of different satellite vehicles (SVs) for the particular GNSS system or possibly for more than one GNSS system. Assistance data may be provided to the mobile device—e.g. by a location server—to assist the mobile device to acquire signals from SVs that are known from orbital data to be potentially visible to the mobile device. SV measurements may provide relative timing information for different SVs in the form of code phases or pseudo ranges. The measurements may be used by the mobile device to determine its own location if the mobile device can obtain accurate orbital data for the SVs either from information transmitted by one or more of the SVs or from another source such as a location server. Alternatively, the measurements may be sent by the mobile device to a location server (e.g. via a positioning protocol like RRLP, LPP or LPP combined with LPPe which is denoted herein as LPP/LPPe) which may then compute the location of the mobile device using orbital data obtained via a local receiver or a reference network. If the mobile device or location server starts with no time of day information regarding when the measurements were made, measurements for at least 5 separate SVs may be used to determine the location of the mobile device in 3 dimensions (e.g. latitude, longitude and altitude) because 4 variables can then be obtained (3 location coordinates and the time of the measurements) and the millisecond ambiguity in the code phase or pseudo range measurements can be resolved. However, if the mobile device can align all measurements to a common time instant whose absolute (e.g. GPS) time can be known to within 1 millisecond, then measurements for only 4 SVs may be needed to determine the location. The number of separate SV measurements may sometimes be reduced further (e.g. to 3) if the altitude of the mobile device can be independently determined or if the measurement time can be determined even more accurately.

However, for mobile devices that are deep inside a building or underground (e.g. in a subway, basement or parking garage) or in a tunnel, obtaining even 1 SV measurement may be difficult. In the case of femtocells, because a femtocell may not be moved for long periods, advantage may be taken of the fixed location. In particular, a femtocell may make measurements of different SVs at different times rather than at exactly the same time. This may enable location of the femtocell (or a mobile device that temporarily stays at a fixed location) where the number of SVs measured at any one time is insufficient to locate the femtocell.

Relying on SV measurements made by a femtocell at different times may still be challenging if the femtocell cannot normally receive even 2 SV signals or if the SV signals received always come from a particular direction. For example, a femtocell in a tall building that is near one outside wall may only receive SV signals through this outside wall and not through the roof or through other walls. In this case, while the position of the femtocell may be obtained if enough SV signals are measured by the femtocell at the same or at different times, accuracy may be very poor due to the highly skewed geometry (high geometric dilution of precision) as is well known in the art.

To overcome the above situation, SV measurements made by a group of femtocells relatively nearby to one another (e.g. in the same building or building complex) may be combined to obtain the locations of all the femtocells in the group. Because the burden of obtaining SV measurements is now distributed over a group of femtocells rather than being concentrated on each individual femtocell, the method is referred to as distributed A-GNSS position determination (or distributed A-GNSS positioning). The SV measurements may all be made at the same time or at different times. The measurements may be used to solve for equations relating the location coordinates (e.g. x, y, z) of each of the femtocells. Additional terrestrial radio signal measurements (e.g. round trip time or time of arrival difference) made by or of the femtocells may be used to further relate the (x, y, z) coordinates. If enough terrestrial measurements are available, the total number of SV measurements needed to locate all of the femtocells may be reduced to around seven or less as shown further down herein in various embodiments. With existing methods of locating femtocells or mobile devices, the number of SV measurements per femtocell or mobile device, whether or not made at the same time, can typically be 3, 4 or 5. So for a large group of femtocells, the total number of SV measurements may become very large and poor geometry as described above may degrade the resulting location accuracies.

FIG. 1 illustrates an exemplary distributed A-GNSS position determination system according to some aspects of the present disclosure. In this example, the distributed A-GNSS position determination system includes a network 100, a group of femtocells 102a, 102b, 102c, 102d and 102e, which may be connected to a location server 104 via network 100. The group of femtocells 102a-102e may obtain location and timing information from (i) one or more SVs 106a, 106b, 106c and 106d, (ii) radio beacons 108a and 108b, or (iii) other sources, such as user equipments (UEs) 110a and 110b.

According to embodiments of the present disclosure, femtocells 102a-102e can be configured to measure signals from satellites 106a-106d that may be part of a GNSS. The radio beacons 108a and 108b can be any combinations of base stations, home base stations and wireless local area network (WLAN) access points (APs). The radio beacons 108a and 108b may support wireless communication according to (i) the GSM, WCDMA or LTE standards defined by 3GPP; (ii) the CDMA 1xRTT and EvDO standards defined by 3GPP2; (iii) the 802.11 WiFi or 802.16 WiMax standards defined by IEEE; or (iv) some other standard. Radio beacons that act as base stations for LTE are known as eNodeBs and home base stations or femtocells that support LTE are known as Home E-UTRAN NodeBs (HeNBs). Femtocells 102a-102e can be configured to measure signals, such as signal strength, signal quality, timing and timing differences, from the radio beacons 108a and 108b.

Femtocells 102a-102e may be in communication with a location server 104 that is part of or attached to a network. Location server 104 may be a Serving Mobile Location Center (SMLC), a Standalone SMLC (SAS) or an Enhanced Serving Mobile Location Center (E-SMLC) which are all defined by 3GPP. Location server 104 may also be a SUPL Location Platform (SLP) defined by OMA or a Position Determining Entity (PDE) defined by 3GPP2. Location server 104 may provide assistance data to femtocells 102a-102e—e.g. assistance data to (i) help femtocells 102a-102e acquire and measure signals from SVs 106a-106d and/or from radio beacons 108a and 108b; and assistance data to (ii) help femtocells 102a-102e compute their respective locations from these measurements. Location server 104 may also request measurements or a location estimate from femtocells 102a-102e. Femtocells 102a-102e and location server 104 may employ a positioning protocol to exchange location related information such as conveying assistance data from location server 104 to femtocells 102a-102e and/or conveying measurements or a location estimate from femtocells 102a-102e to location server 104. The positioning protocol may be LPP, LPPe, LPP/LPPe, RRLP, RRC, IS-801 or some other protocol. Location server 104 may contain a database with information on satellites 106a-106d (e.g. orbital and timing data), on radio beacons 108a and 108b (e.g. absolute location coordinates of radio beacons, antenna characteristics, transmission power, transmission timing relative to other radio beacons or relative to satellites 106a-106d). Location server 104 may be configured to provide some of this information to femtocells 102a-102e as assistance data using positioning protocol—e.g. on request by femtocells 102a-102e or when location server 104 obtains the location of femtocells 102a-102e (for example when each femtocell is initialized). Location server 104 and femtocells 102a-102e may use positioning protocol as part of a control plane solution for determining location or as part of a user plane location solution.

The network 100 may be a wireless network and support GSM, WCDMA, LTE, CDMA 1xRTT, CDMA EvDO, WiFi, WiMax or some other wireless technology. The network 100 may also be a wireline network (e.g. support DSL or packet cable access). Some or all of radio beacons 108a and 108b may be part of network 100 or part of some other network not shown in FIG. 1 and may be capable of communicating with location server 104—e.g. in order to update information concerning them (e.g. transmission timing) stored by location server 104. Femtocells 102a-102e may be part of network 100 (e.g. provide wireless access on behalf of the operator of network 100) or part of some other network not shown in FIG. 1. Location server 104 may be part of network 100, attached to network 100 or part of or attached to some other network not shown in FIG. 1. Femtocells 102a-102e may access location server 104 (e.g. to receive assistance data or send measurements using a positioning protocol) via elements (e.g. routers, gateways) belonging to network 100 or belonging to some other network (not shown in FIG. 1).

According to embodiments of the present disclosure, the position of femtocells 102a-102e may be determined using measurements obtained by the femtocells 102a-102e over different times. The measurements obtained may include signal strength, signal quality or signal timing including absolute timing and relative timing of one signal source versus another. The femtocells 102a-102e may compute a location estimate from these measurements or provide the measurements to location server 104 to compute a location estimate (e.g. using positioning protocol). Existing terrestrial based position methods may be used to determine the location of femtocells 102a-102e—e.g. the Observed Time Difference of Arrival (OTDOA) position method defined by 3GPP for LTE and WCDMA radio access, the Advanced Forward Link Trilateration (AFLT) method defined by 3GPP2 for CDMA 1x and EvDO radio access, and the Enhanced Cell ID (ECID) method defined by 3GPP and OMA for various wireless access types.

If a femtocell, assumed as an example here to be femtocell 102a in FIG. 1, can receive and measure the timing of signals from a sufficient number of radio beacons including 108a and 108b in FIG. 1 and possibly other radio beacons not shown in FIG. 1, then the location of femtocell 102a may be determined either by femtocell 102a or by a location server, assumed as an example here to be location server 104, using existing position methods such as OTDOA, AFLT or ECID. These position methods make use of known and fixed locations for radio beacons (e.g. known to a location server 104) and the timing differences measured by femtocell 102a between pairs of radio beacons. If a pair of radio beacons (e.g. radio beacons 108a and 108b) have synchronized transmission (e.g. synchronized by a GNSS receiver associated with each radio beacon) or if the transmissions are asynchronous but the real timing difference between them is known (e.g. as obtained from OTDOA measurements made by other femtocells), then any measured timing difference locates femtocell 102a along a hyperbola in 2 dimensions or on a hyperbolic surface in 3 dimensions. When measured timing differences are obtained by femtocell 102a for 2 (or 3) different pairs of radio beacons, femtocell 102a may be located at the intersection of the 2 (or the 3) hyperbolas (or hyperbolic surfaces) defined by each measured timing difference.

Instead of obtaining timing differences between pairs of radio beacons, femtocell 102a may instead determine the signal propagation time or the round trip signal propagation time between itself and a radio beacon (e.g. radio beacon 108a or 108b) either as part of normal network operation or by separate additional measurements. If femtocell 102a (or location server 104) can determine the propagation times between femtocell 102a and 3 (or 4) separate radio beacons, then the location of femtocell 102a may be obtained from the intersection of 3 circles in 2 dimensions (or 4 spheres in 3 dimensions), each centered on a different one of the 3 (or 4) radio beacons and with a radius given by the signal propagation distance corresponding to the measured signal propagation time for that radio beacon.

Note that when femtocell 102a is unable to receive and measure signals from a sufficient number of radio beacons or when femtocell 102a can receive sufficient signals but only from one direction, accurate location determination may not be possible. Signals received from only one direction may make location determination inaccurate due to poor geometry (similar to inaccurate location resulting from poor geometry for GNSS location where SVs can be received from only one direction). This situation is more likely to occur when femtocell 102a is inside a building. To circumvent this difficulty, femtocell 102a may measure signals from other femtocells located nearby. In buildings where many femtocells are deployed, this situation may be addressed as typical inter-femtocell distances may be small and intervening objects that may reflect or attenuate signals (e.g. walls, ceilings and floors, furniture, people) may be limited. Thus, femtocell 102a may be able to receive and measure the signals from a number of other femtocells (e.g. from femtocells 102b-102e). Femtocells 102a-102e in FIG. 1 may then each measure timing differences between one another and/or propagation times between one another. It may happen that a femtocell (e.g. femtocell 102a) cannot measure signals from all femtocells in the group, but the femtocell may still measure signals from some subset of the femtocells—e.g. a sufficient number to locate the femtocell if the locations of each femtocell in the subset of femtocells being measured is known.

The resulting measurements by all femtocells in the group 102a-102e of other femtocells in the group may provide a set of equations, where there is one equation for each measurement, relating the (x, y, z) coordinates of the different femtocells (where the x coordinate may define latitude, the y coordinate longitude and the z coordinate altitude). The equations may further include the unknown real transmission timing differences between the femtocells if the measurements are OTDOA measurements and the femtocells are not synchronized. With enough OTDOA measurements, such measurements may be used to solve for the unknown (x, y, z) coordinates (and the real transmission timing differences if OTDOA measurements are used) in a relative sense to provide a set of relative locations for all femtocells in the group 102a-102e. Known relative locations may define a fixed relative location structure for the group of femtocells 102a-102e—for example where each femtocell is at a different corner of a pentagon of known size and geometry as shown in FIG. 1 or where each femtocell is at the corner of a cube of known size (not shown in FIG. 1).

In the case of measurements of the propagation time between pairs of femtocells, each propagation time measurement may define the distance between a pair of femtocells (by multiplying each propagation time by the signal speed which would typically be the speed of light). The resulting measured distances between any three femtocells, for example between femtocells 102a and 102b, 102b and 102c and 102a and 102c, may then define a triangular shape S1 where each of the three femtocells (102a, 102b and 102c) is at a different corner of the triangle. This may be repeated for other femtocells to expand the initial triangular structure S1. For example, given the measured distances between femtocell 102d and each of femtocells 102a, 102b and 102c, femtocell 102d may be located at one corner of a structure S2 that is either (i) a tetrahedron shape in 3 dimensions or (ii) a quadrilateral in 2 dimensions whose other 3 corners form the triangle S1. Other femtocells may be similarly added to extend the shape S2 to further shapes which may either be polygons in 2 dimensions or polyhedrons in 3 dimensions, where extension in 2 dimensions may occur when all femtocells have almost the same altitude (e.g. for femtocells on the same floor of the same building) and extension in 3 dimensions may occur when femtocells have different altitudes (e.g. for femtocells distributed on different floors of a building). If there are errors in the measured distances between pairs of femtocells then minimization techniques may be used to find the most probable relative locations—for example by finding a shape where the sum of the squares of the actual distances between the femtocells in each pair minus the corresponding measured distances is minimized.

In the case of an OTDOA measurement by one femtocell 102a of the transmission timing differences between a pair of femtocells 102b and 102c, the OTDOA measurement may provide an equation relating the x,y,z coordinates of femtocell 102a to the x,y,z coordinates of femtocells 102b and 102c and the real transmission timing difference between femtocells 102b and 102c. If there are n femtocells in a local group and each femtocell can obtain an OTDOA measurement for every other pair of femtocells, $n*(n-1)*(n-2)/2$ distinct measurements may be obtained overall. This may be more than sufficient to solve for the relative x,y,z coordinates of the n femtocells (which produce $3*n$ variables) and the $n-1$ distinct timing differences between any one femtocell (e.g. 102a) and each of the other femtocells. For example, the relative x,y,z coordinates of femtocell 102a may each be set to zero, the relative x and y coordinates of femtocell 102b may be set to zero and the relative x coordinate of femtocell 102c may be set to zero as an initial assumption without restricting the relative location shape. With these initial settings, the $n*(n-1)*(n-2)/2$ equations may then be solved. In the case of measurement errors, a technique may be used to derive the most probable set of relative coordinates whereby the sum of the squares of the differences between actual values and corresponding measured values is minimized. When some or all femtocells can only measure timing differences between some other pairs of femtocells, the number of measurements and thus the number of available equations may be reduced but may still be sufficient to solve for the relative coordinates and real timing differences.

When none of the femtocells has a known absolute location and measurements are not made of radio beacons whose locations are known, then the location structure for the femtocells (e.g. the pentagon shown in FIG. 1 or a cube, quadrilateral, tetrahedron, polygon or polyhedron not shown in FIG. 1) may have an unknown absolute location and orientation. To determine the location and orientation, the absolute locations of 3 femtocells in the group 102a-102e may be determined by separate means—e.g. using A-GNSS measurements or OTDOA measurements of fixed radio beacons 108a and 108b. Absolutely locating 3 of the femtocells in the group 102a-102e can fix the location of the whole group of femtocells due to their already known fixed relative location structure. If only two femtocells in the group 102a-102e are absolutely located, the relative location structure may have rotational freedom about the axis joining the 2 absolutely located femtocells which may imply one unknown variable to be determined in order to determine all femtocell locations absolutely. If only one femtocell in the group 102a-102e is absolutely located, the relative location structure may take any orientation about the single absolutely located femtocell which may imply three unknown variables (e.g. three Euler angles) to be determined in order to determine all femtocell locations absolutely. If none of the femtocells are absolutely located, then the relative location structure may take any orientation and any absolute location which may imply six unknown variables (three for orientation and three for location) to be determined in order to determine all femtocell locations absolutely.

A complexity with absolutely locating an individual femtocell in order to locate the group of femtocells 102a-106e when the relative locations of all femtocells 102a-102e are known from measurements made between the femtocells is that any individual femtocell may require signals from up to 5 GNSS SVs in the case of GNSS or A-GNSS or from 3 or more terrestrial radio beacons in the case of OTDOA, AFLT, or positioning based on signal propagation time assuming the different SVs or radio beacons have good geometry (e.g. are not all received in same general direction at the measuring femtocell). This may not be achievable for some femtocells inside a building.

As an alternative, some but not all of the femtocells 102a-102e may each measure pseudo ranges (or code phases) for just a few (e.g. one or two) GNSS SVs either at the same time or at several different times. This reduction in measurements may be more readily accomplished and may not be limited by geometry. For example, femtocell 102a may have some limited visibility of GNSS SVs in a Northerly direction and measure a few SVs in this direction at the same time or at different times. Another femtocell 102b may have some visibility of GNSS SVs in an Eastward direction and measure a few SVs in this direction at the same time or at different times. This may be repeated for other femtocells in the group—e.g. for femtocell 102c in a Southerly direction and femtocell 102d in a Westward direction. Allowing GNSS pseudo range measurements at different times may be valid if each femtocell in the group 102a-102e maintains a fixed location (i.e. is not moved to a different location). The resulting set of GNSS pseudo range measurements may be treated according to two alternative embodiments. In one embodiment, the pseudo range measurements may be treated as having been made by the same entity (which may be equivalent to assuming all contributing femtocells have substantially the same location) which may result in determining a location that relates to the whole group of femtocells 102a-102e (e.g. may be considered as an average location). The initial group location of the femtocells may be substantially near the centroid of the contributing femtocells weighted by the number of SV pseudo range measurements contributed by each femtocell in the group.

In the other embodiment each SV pseudo range measurement may be used to define an equation relating the absolute (x, y, z) coordinates of the measuring femtocell and the time at which the measurements are made. In this other embodiment, the equations resulting from the SV measurements may be combined with the equations resulting from the inter-femtocell measurements to solve for the absolute (x, y, z) coordinates of all femtocells.

Obtaining measurements by each femtocell of other femtocells and of GNSS satellites may be coordinated by location server 104—e.g. by employing a SUPL or control plane location solution and a positioning protocol like LPP, LPPe or LPP/LPPe. Location server 104 may request each femtocell in the group 102a-102e to perform and return the measurements after which location server 104 may solve the collection of equations provided by the measurements as described above. In an alternative embodiment, a particular femtocell 102a may instigate the measurements from the other femtocells 102b-102e, receive the measurement results and compute the locations. In yet another embodiment, each femtocell in the group 102a-102e may obtain its own measurements of other femtocells and of GNSS SVs and provide these measurements to other femtocells in the group 102a-102e, wherein each femtocell or some subset of femtocells may solve for the locations of all femtocells.

In order to determine the femtocells within a particular group 102a-102e, location server 104 or one of the femtocells 102a, may simply request each femtocell to make measurements of other femtocells (and possibly radio beacons) that are visible to that femtocell. When a set of femtocells provides a central entity (e.g. location server 104) with the identities of the other femtocells that are visible to femtocells within the set and possibly associated measurements, the central entity may determine a group by starting with some initial femtocell 102a, adding to it all the femtocells visible to that initial femtocell (e.g. 102b and 102c), further adding femtocells visible to these added femtocells (e.g. 102d and 102e) and so on until femtocells are encountered for which femtocells outside the group so far determined are not visible. This embodiment may for example succeed in identifying all or most femtocells within the same building but may not include femtocells in other buildings. To reduce the chance of accumulating a group of femtocells that include femtocells from multiple buildings, a new femtocell may only be added to a group if the signal reception strength of the new femtocell by at least one femtocell already in the group (or the signal strength in the opposite direction) exceeds some threshold.

As described above, pseudo range measurements obtained at different times may be used for determining position of the group of femtocells 102a-102e. In one implementation, at time T1, the method obtains a first set of SV pseudo range measurements from some or all members of the group of femtocells 102a-102e; and at a later time T2, the method obtains a second set of SV pseudo range measurements from some or all members of the group of femtocells 102a-102e. The process may be repeated (at time T3 and etc.) to obtain additional sets of SV pseudo range measurements. Note that pseudo range measurements made by a femtocell at different times may be of the same SV since the change in location of the SV during the intervening time may mean that the later measurement is not determined by the first measurement. Note further that each new measurement set introduces at least one new time variable to be solved for which corresponds to the time at which each set of measurements is made. This assumes that SV pseudo range measurements made by separate femtocells for a particular measurement set can be aligned to the same time instant which is described further down herein. If each measurement set provided by a femtocell contains at least two SV pseudo ranges, then each measurement set is minimally introducing a new time variable but is also providing at least two equations for the absolute (x, y, z) coordinates of the femtocell. This means separate measurement sets may be combined to help solve for the absolute (x, y, z) coordinates of each femtocell in the local group. One of the benefits of combining SV pseudo range measurements from all femtocells in the group and at different times is that it allows for determination of a common group location in more challenging environments, and it allows for determination of more accurate individual femtocell locations in environments where one or more femtocells can obtain range information from four SVs.

According to embodiments of the present disclosure, to determine positions for the group of femtocells 102a-102e, the method may use a time reference to remove the millisecond ambiguity in GPS or other GNSS code phase measurements. This is because with millisecond ambiguity and only code phase measurements, code phases from five different SVs may be needed to determine location and timing information (x, y, z, t) for any single femtocell. A time reference for millisecond ambiguity may be accurate within 0.5 milliseconds (ms).

In one approach, the method may obtain a time reference that allows GNSS pseudo range measurements obtained from different femtocells 102a-102e at approximately the same time to be accurately adjusted (or aligned) to the same time instant. If the same time reference is available to each femtocell that makes GNSS measurements, each femtocell may align its measurements to the same time instant or may accurately timestamp the measurements so that location server 104 can align the measurements or take account of the known difference between the measurement times. The main purpose of using a common time reference may be to reduce the number of time variables to be solved in equations relating absolute femtocell x,y,z coordinates and measurement times to particular SV pseudo ranges. When obtaining pseudo range measurements at a single femtocell 102a to determine the location of that femtocell, one approach is to align all pseudo range measurements to the same time instant in order to produce only one time variable that may be obtained along with the absolute x,y,z coordinates of femtocell 102a. If SV pseudo range measurements are obtained by multiple femtocells within the group 102a-102e, each femtocell may be allowed to align its own pseudo range measurements to a different time instant than that used by any of the other femtocells. This approach may solve for a different time variable for each femtocell unless the different time instants can be related via use of a common time reference. Solving for a different time variable for each femtocell means that not one but at least two SV pseudo range measurements from the femtocell at this time instant may be used to help solve for the x,y,z coordinates of the femtocell because of the introduction of one new time variable to be determined Note that, by aligning or relating pseudo range measurements from different femtocells to the same time instant, the method may solve for one time variable for all femtocells. This may mean that even one SV pseudo range measurement from a femtocell may be used to help solve for the x,y,z coordinates of that femtocell. In general, pseudo range measurements for n different SVs from any femtocell (provided at the same time or at a number of different times) are useful if the number of new variables associated with the femtocell is less than n. If the location of the femtocell relative to other femtocells can be determined via measurements between femtocells (e.g. OTDOA time difference or signal propagation time) and if the pseudo range measurement time can be aligned with or related to pseudo range measurement times for other femtocells, then a femtocell may not contribute any new variables, which means that even one SV pseudo range measurement may be useful in those situations.

According to embodiments of the present disclosure, GNSS time (e.g. GPS time) can be used as a time reference to enable different femtocells 102a-102e to align pseudo range measurement time to the same time instant or to timestamp measurements. Using the GNSS time, location server 104 can perform the alignment or take into account the time difference between measurements. GNSS time may be obtained by: 1) any femtocell 102a that obtains GNSS time either by SV signal demodulation or by solving for time and its location from five or more SV code phase measurements; 2) any radio beacon 108a with a GPS (or other GNSS) receiver where the radio beacon 108a provides location server 104 with the association between its transmission timing and GPS (or other GNSS) time; 3) any femtocell 102a that provides GNSS time (either directly or in the form of SV pseudo range measurements that can be solved to yield GNSS time) to location server 104 together with the femtocell 102a or a radio beacon 108a transmission timing corresponding to the GNSS time; or 4) any radio beacon 108a (e.g. for LTE or CDMA 1xRTT)

with a GPS (or other GNSS) receiver or other source of GPS (or GNSS) time that synchronizes its transmission timing to GPS (or other GNSS) time. In case (1), GNSS time becomes directly available to femtocell 102a. In case (2) and case (3), location server 104 may provide the association between GPS/GNSS time and radio beacon 108a or femtocell 102a transmission timing to any femtocell 102b (e.g. using a positioning protocol). Femtocell 102b may then infer GPS/GNSS time using this association and the visible transmission timing from radio beacon 108a or femtocell 102a. In case (2) and case (3), location server 104 and femtocell 102b can be configured to allow and adjust for the signal propagation times associated with receiving transmission timing from radio beacon 108a or femtocell 102a when providing or using the association between this transmission timing and GPS/GNSS time in order to accurately obtain GPS/GNSS time. As an alternative to providing a common GNSS time according to case (2) and case (3), location server 104 may not need to know the association of GNSS time to the transmission timing of radio beacon 108a or femtocell 102a in order to align or relate SV pseudo range measurements from different femtocells to the same time instant. This may be the case, for example, if all femtocells can receive signals from a common radio beacon 108a or common femtocell 102a and use the transmission timing of radio beacon 108a or femtocell 102a as a common time reference. In case (4), GPS (or GNSS) time may be conveyed to femtocells 102a-102e via association with radio beacon 108a timing due to the synchronization of this timing with GPS/GNSS time—which may either be defined for the particular radio technology (e.g. as for CDMA 1xRTT) or allowed as an option for the radio technology (e.g. as for LTE). The signal propagation time from radio beacon 108a to any femtocell 102a may be taken into account in case (4) if GNSS time is used by femtocell 102a to align or timestamp its GNSS SV pseudo range measurements.

In some implementations, if a femtocell 102a obtains or receives GNSS time (e.g. as in cases (1) and (4) above), the GNSS time may be provided by femtocell 102a to location server 104 using an LPP or LPP/LPPe Provide Location Information message as defined for the LPP and LPP/LPPe positioning protocols. The provided GNSS time may be associated with the transmission timing of one or more radio beacons 108a-108b and/or one or more femtocells in the group 102a-102e. Note that once location server 104 has been provided by a femtocell 102a with the GNSS time association for a particular radio beacon 108a or femtocell 102b, the GNSS time association may be used to determine a GNSS time association for other femtocells and radio beacons using OTDOA measurements provided by femtocells and/or UEs to location server 104. Since an OTDOA measurement provides the timing difference observed by a femtocell or UE between a pair of radio beacons or femtocells, location server 104 may determine the actual (real) timing difference between the pair of radio beacons or femtocells by allowing for propagation times between the femtocell or UE making the OTDOA measurement and each radio beacon or femtocell for which the OTDOA measurement is made—assuming the locations of these entities are known (e.g. as in the case of radio beacons) or can be determined (e.g. as in the case of femtocells and UEs). The real timing difference may then be used to convert a known association of GNSS time to transmission timing for one radio beacon 108a or femtocell 102a into an association of GNSS time to transmission timing for another radio beacon 108b or femtocell 102b.

GPS/GNSS time association (e.g. determined as above) may be provided by location server 104 to femtocells 102a-102e (and UEs 110a-110b) using LPP or LPP/LPPe Provide Assistance Data messages. This may mean that once the association of GNSS time to transmission timing is obtained by location server 104 for one femtocell 102a in a local group of femtocells 102a-102e, location server 104 may then determine a GNSS timing association for all other femtocells 102b-102e making use of OTDOA measurements made by femtocells 102a-102e of pairs of other femtocells and the relative locations of the femtocells (determined by OTDOA and/or signal propagation timing measurements). Location server 104 may then transfer the GNSS timing association for each femtocell in the group 102b-102e to that femtocell.

In some implementations, it may be challenging to schedule the GNSS measurements from different femtocells 102a-102e involved in distributed A-GNSS system to exactly the same time instant because different femtocells may make measurements at different times for operational reasons such as transmitting or receiving control signals or data at particular times. Instead, femtocell SV pseudo range measurements may be scheduled by server 104 to occur within a common time window defined by GNSS time or by a local femtocell 102a or local radio beacon 108a transmission time reference. If femtocells 102a-102e employ the transmission timing from a common radio beacon 108a or common femtocell 102a as a time reference to timestamp GNSS pseudo range measurements that are made within a small common time window but at different time instants, the different timestamps may contain small errors due to frequency instability associated with the common transmission timing. In the case of LTE, frequency stability is mandated by 3GPP to be within 0.25 parts per million (ppm) for a femtocell, 0.1 ppm for a pico eNodeB, and 0.05 ppm for a macro eNodeB. This means that the maximum cumulative time reference error in transmission timing over one second may range from 250 nanoseconds (ns) (equivalent to 75 meters of radio signal propagation) for a femtocell to 50 ns (15 meters of radio signal propagation) for an eNodeB. To reduce time related errors to less than 10 meters, a time window for scheduling GNSS pseudo range measurements of 0.67 seconds or 0.13 seconds may then suffice when an eNodeB or an LTE capable femtocell (i.e. an HeNB) are used as a time reference, respectively. Signal propagation delays from any femtocell or eNodeB that is acting as a time reference may also be included when aligning measurements made at different times. The propagation delays may be a function of the femtocell (and eNodeB) locations and do not add new variables to the position calculations.

As described above, SV pseudo range measurements may be used to compute the locations of a group of femtocells 102a-102e. In determining a minimum number of SV pseudo range measurements to be used for the computation, the method may take into considerations that 1) OTDOA measurements and/or signal propagation times may be obtained by femtocells for other femtocells in the group as described previously in association with FIG. 1 to obtain relative femtocell locations; 2) millisecond ambiguity in GNSS pseudo range measurement time may be resolved by obtaining or providing (e.g. from location server 104) GNSS time to around 0.5 ms accuracy or better; and 3) GNSS measurements by different femtocells may be aligned by location server 104 to substantially the same time instant T via a common reference time and suitable scheduled measurement time window as described above. With these preconditions, the absolute locations of all femtocells in the group 102a-102e can be obtained by determining a small number of absolute coordinates for a few femtocells in the group plus the measurement time instant T.

In one exemplary implementation, if the group comprises just two femtocells 102a and 102b, the method may compute just six variables. For example, variables x, y, z, and T for femtocell 102a may be determined (where x, y, z is the absolute location of femtocell 102a), and the azimuth and altitude of femtocell 102a relative to the femtocell 102a may be obtained. In another implementation, other sets of six variables may be used for determining locations of the two femtocells. For example, pseudo range measurements for four different SVs obtained by femtocell 102a may suffice to determine the x, y, z, T variables for femtocell 102a and pseudo ranges for a further two SVs from femtocell 102b may suffice to obtain the azimuth and altitude of femtocell 102b relative to femtocell 102a. For another example, pseudo range measurements from three different SVs from each femtocell may also suffice since this can produce three equations for each femtocell for the x, y, z, and T for that femtocell with one further equation relating the two sets of x, y, z for each femtocell provided by the OTDOA or propagation time measurements.

In another exemplary implementation, to determine locations of three or more femtocells 102a-102e, the method may compute seven variables. For example, x, y, z, and T for a first femtocell 102a, azimuth and altitude of a second femtocell 102b relative to femtocell 102b, and azimuth or altitude of a third femtocell 102c relative to the first or second femtocell 102a or 102b may be used for determining locations of the three or more femtocells. Pseudo range measurements for four different SVs from the first femtocell 102a, two different SVs from the second femtocell 102b, and one SV from the third femtocell 102c may then suffice to determine these variables.

In other implementations, other sets of seven variables may be used for determining locations of the three or more femtocells 102a-102e. For example, pseudo range measurements for three different SVs from the first femtocell 102a, and three different SVs from the second femtocell 102b, and one SV range from the third femtocell 102c may also suffice. Note that the seven pseudo range measurement may be obtained from any combination of pseudo range measurements received from the three or more femtocells. This is because the femtocells may form a rigid structure once relative locations are determined from OTDOA and/or signal propagation time measurements, and the structure may have six degrees of freedom (e.g. absolute location for one point on the structure plus orientation of the structure about that point). In this example, each pseudo range measurement from a femtocell may provide one equation for the x, y, z, and T of the femtocell, and hence one equation for the location and orientation of the femtocell structure. Therefore, seven equations (provided by seven different pseudo range measurements from at least three different femtocells) may then be used to solve for this location and orientation and the additional T variable.

According to embodiments of the present disclosure, the number of pseudo range measurements obtained from each femtocell (as previously described) need not all be provided at the same time. If pseudo range measurements are obtained by a femtocell 102a at n (n>1) different times that cannot be accurately related, then n−1 additional variables may be found associated with the n−1 new measurement times. In some situations, if a femtocell 102a is able to measure pseudo range measurements for at least 2 different SVs at each measurement time, the additional pseudo range measurements may be used to solve or help solve for the femtocell 102a location, as long as the femtocell location stays fixed, since one SV measurement can be used to solve for the new measurement time while the other SV measurement can be used to solve or help solve for the x,y,z coordinates of the femtocell.

For example, in the case of three or more femtocells 102a-102e, a first femtocell 102a may provide three SV pseudo range measurements at some initial time, and two SV pseudo range measurements at a later time for a total of four useful pseudo range measurements after allowing for computation of the later measurement time. The measurement times may be widely different, such as several hours or even days apart, and may help a femtocell 102a to acquire more SVs when SV visibility may be limited, for example for a femtocell 102a near a small window in a building. In general, if n significantly different measurement times are used by the contributing femtocells, the total number of pseudo range measurements may be n−1 more than the situation when all pseudo range measurements can be aligned to a single time instant. As described earlier, 6 pseudo ranges may be used to fully locate a group of 2 femtocells whereas 7 pseudo ranges may be used to fully locate a group of 3 or more femtocells when there is a single measurement time. This implies that when there are n different measurement times, 5+n or 6+n pseudo ranges may be used to fully locate a group of 2 femtocells or 3 or more femtocells, respectively. For a large group of femtocells, this number can be very much less than the overall number of pseudo range measurements used to locate each femtocell in isolation. Furthermore, by allowing for measurements at different times, it allows femtocells that only occasionally receive signals from SVs to contribute measurements. By using a small number of SV measurements (e.g. contributed by different femtocells at different times), it is also no longer necessary for all femtocells in the group to receive and measure SV signals.

According to embodiments of the present disclosure, the minimum number of SV pseudo range measurements discussed previously can be reduced even further if the femtocells 102a-102e are able to obtain OTDOA, signal propagation time or other signal measurements for radio beacons 108a-108b with known locations. In these situations, the additional SV pseudo range measurements and OTDOA or signal propagation time measurements for radio beacons 108a-108b may instead be used to improve location accuracy and simplify location computation through iterative procedures, for example. Note that the situation of additional pseudo range measurements may also occur when more than four pseudo range measurements to different SVs are obtained by any one femtocell.

Figure 2A:
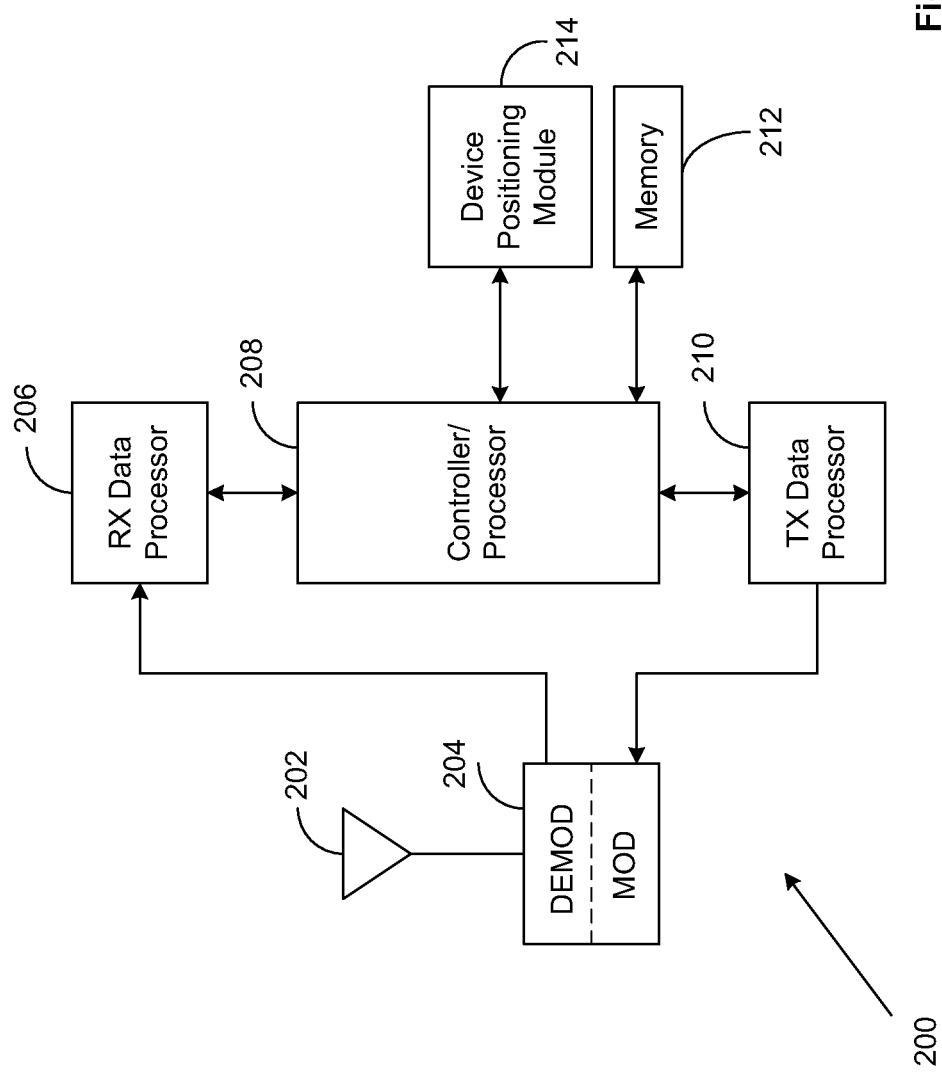
FIG. 2a illustrates an exemplary apparatus configured to determine femtocell positions according to some aspects of the present disclosure.

FIG. 2a illustrates a block diagram of exemplary apparatus configured to determine femtocell positions according to some aspects of the present disclosure. At the apparatus 200, antenna 202 is configured to receive modulated signals from a base station or signals from one or more wireless terminals, and provides the received signals to a demodulator (DEMOD) part of a modem 204. The demodulator processes (e.g., conditions and digitizes) the received signal and obtains input samples. It further may perform orthogonal frequency-division multiplexing (OFDM) demodulation on the input samples and provides frequency-domain received symbols for all subcarriers. An RX data processor 202 processes (e.g., symbol de-maps, de-interleaves, and decodes) the frequency-domain received symbols and provides decoded data to a controller/processor 208 of the apparatus 200. In other embodiments, the exemplary apparatus can be configured to work with code division multiple access (CDMA) based systems.

The controller/processor 208 can be configured to control the apparatus 200 to communicate with a server via a wireless network. A TX data processor 210 generates signaling symbols, data symbols, and pilot symbols, which can be processed by modulator (MOD) of modem 204 and transmitted via the antenna 202 to a base station or to the one or more wireless terminals. In addition, the controller/processor 208 directs the operation of various processing units at the apparatus. Memory 212 can be configured to store program codes and data. Device positioning module 214 can be configured to determine absolute and relative positions of the femtocells. According to embodiments of the present disclosure, the apparatus of FIG. 2a may be implemented in server 104, or it may be implemented in one of the femtocells 102a-102e.

Figure 2C:
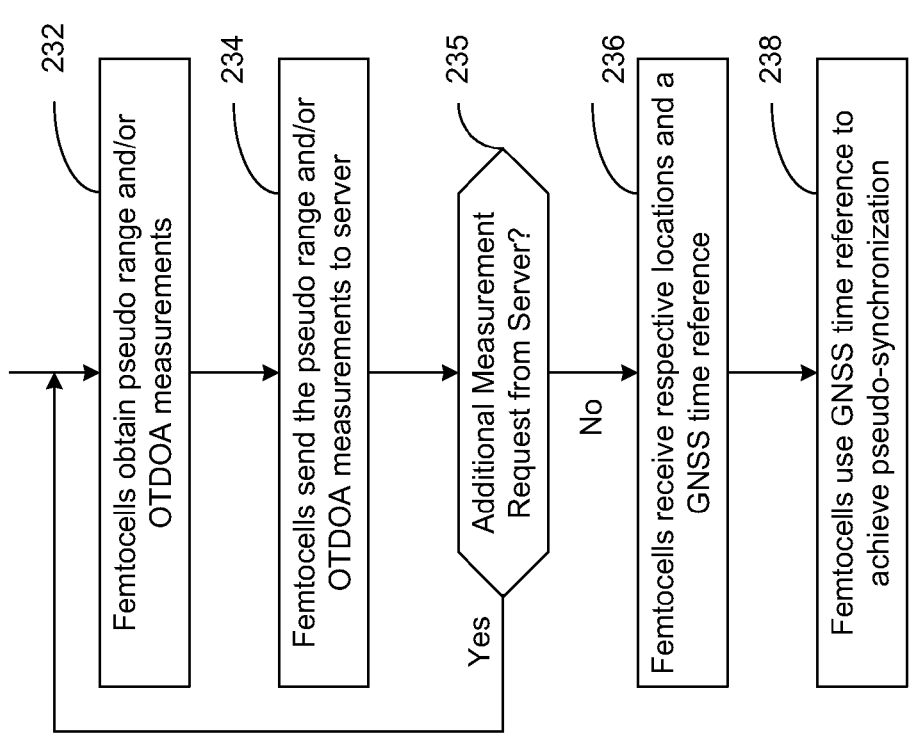
FIG. 2c illustrates another method of determining femtocell positions according to some aspects of the present disclosure.
Figure 2B:
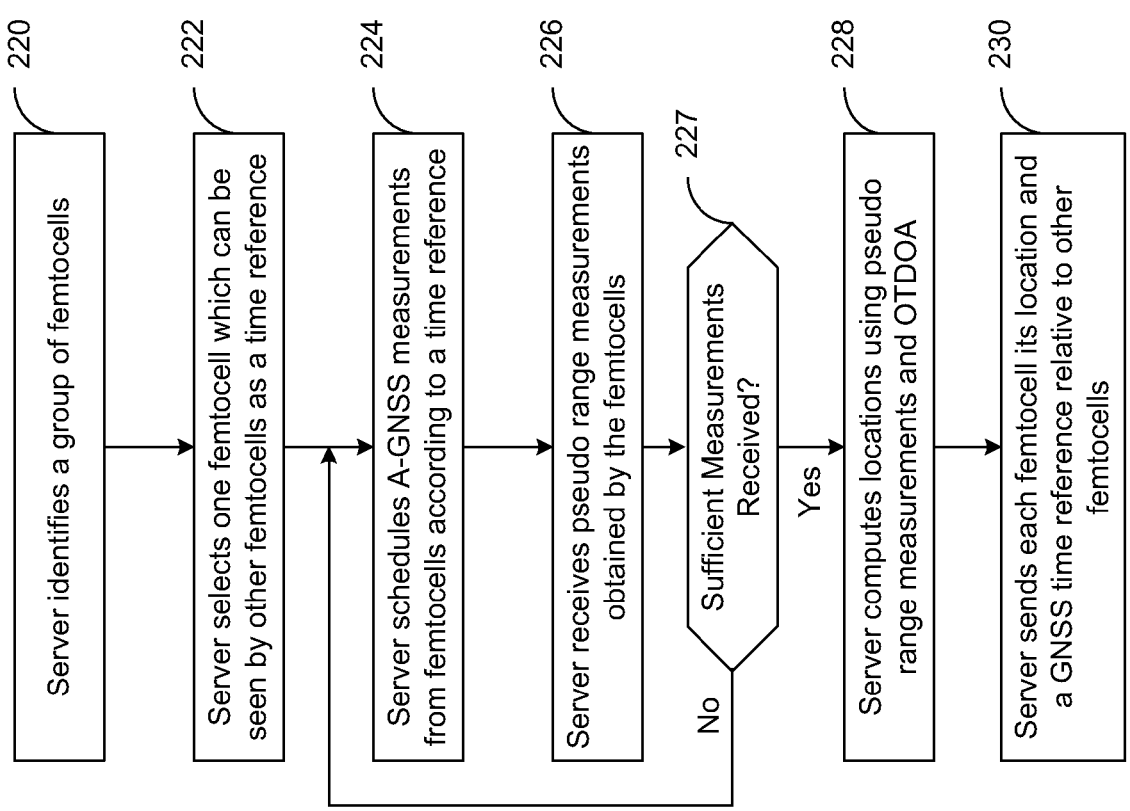
FIG. 2b illustrates a method of determining femtocell positions according to some aspects of the present disclosure.

FIG. 2b illustrates a method of determining femtocell positions according to some aspects of the present disclosure. In the example shown in FIG. 2b, in block 220, location server 104 identifies a group of femtocells for positioning determination. Location server 104 may identify the group as described earlier by receiving an indication from each femtocell (e.g. using SUPL or LPP/LPPe) of the other femtocells and radio beacons (e.g. base stations, APs, eNodeBs) whose signals can be received by that femtocell. Server 104 can construct the group by including only femtocells that can receive one another's signals—e.g. by starting with one femtocell, adding all femtocells detectable by that femtocell, further adding femtocells detectable by these additional femtocells etc.). In block 222, location server 104 determines a single radio beacon or femtocell whose signals can be received by all femtocells in the group to act a common time reference for all femtocells. Alternatively location server 104 may associate the transmission timing of a number of different radio beacons and femtocells using OTDOA and signal propagation delay measurements provided by the femtocells. In this case in block 222, location server 104 may determine a set of radio beacons and/or femtocells whose transmission timing has been associated to act as time references. In block 224, location server 104 schedules A-GNSS pseudo range measurements from some or all femtocells in the group and includes a common time reference or a common time window at or within which measurements are to be obtained. The scheduling may be performed using the combined LPP/LPPe positioning protocol—e.g. by location server 104 sending an LPP/LPPe Provide Location Information message to each femtocell in the group carrying a request for the A-GNSS measurements and providing the time window using either the single femtocell or radio beacon that has been chosen as a time reference or one of the radio beacons or femtocells that have been chosen as time references or using GNSS time as a time reference or using a time offset from current time as a time reference. In block 226, location server 104 receives pseudo range measurements obtained by the femtocells at different times but generally close to the common time reference or within the common time window specified in block 224. In block 227, a determination of whether the received measurements are sufficient to determine some or all femtocell locations is made. If the received measurements in block 226 are insufficient to determine some or all femtocell locations (227_No), location server 104 may repeat blocks 224 and 226 at a later time to obtain measurements for the later time. The repetition may be accomplished by sending a new request from location server 104 to each femtocell or by having location server 104 request periodic measurements from each femtocell the first time block 224 is initiated. Any periodic measurements may be scheduled at fixed time intervals or may be scheduled to occur following the occurrence of particular trigger conditions (e.g. triggered when a femtocell is able to receive and measure signals from a new SV) or may be scheduled to occur at fixed time intervals only when particular trigger conditions occur. If the received measurements in block 226 are sufficient to determine some or all femtocell locations (227_Yes), the method moves to block 228. In block 228, location server 104 computes absolute locations using the received pseudo range measurements and measurements for OTDOA, and/or signal propagation time made by femtocells for other femtocells and radio beacons. In block 230, location server 104 may send each femtocell its location and a GNSS time reference relative to this femtocell and/or other femtocells or radio beacons. This may be accomplished using the LPP or combined LPP/LPPe positioning protocol—e.g. where location server 104 sends each femtocell an LPP/LPPe Provide Assistance Data message carrying the location and timing information. The recipient femtocells may then use the received timing information to approximately synchronize their own transmission timing—e.g. to GNSS time or to some other time.

FIG. 2c illustrates another method of determining femtocell positions according to some aspects of the present disclosure. As shown in FIG. 2c, in block 232, femtocells 102a-102e obtain SV pseudo range and/or OTDOA or signal propagation time measurements for other femtocells and/or radio beacons. This may be instigated by each femtocell or requested by location server 104. In the latter case, location server 104 may provide a common time reference or common time window within which the measurements are to be made. In block 234, femtocells 102a-102e send the pseudo range and/or OTDOA or signal propagation delay measurements to location server 104. In block 235, a determination of whether location server 104 needs additional measurements is made. If location server 104 needs additional measurements and sends a new request or if location server 104 originally requested periodic or triggered measurements (235_Yes), the method moves to block 232 and repeats blocks 232 and 234 at one or more later times. Alternatively, if location server 104 does not need additional measurements and issues no requests (235_No), the method moves to block 236. In block 236, femtocells receive respective locations and GNSS time references from location server 104. In block 238, femtocells use time references to achieve pseudo-synchronization. Note that the group of femtocells do not need to be synchronized as a group. Each femtocell may be synchronized individually, during initialization for example.

According to embodiments of the present disclosure, distributed location measurements may be scheduled to ensure that femtocells make measurements at or near substantially the same time instant. One solution that is applicable to the LPP/LPPe positioning protocol is to add a target measurement time and time window into an LPP/LPPe Provide Location Information message. In some implementations, the target measurement time may include any of: 1) GNSS time; 2) a network time using the transmission timing of a particular radio beacon (e.g. a base station) such as by indicating a local system frame number (SFN) time of one or more eNodeBs or femtocells in the case of LTE; and 3) a time relative to the current time.

Scheduling measurements at a particular future time or within a future time window can allow for possible time delay in acquiring and measuring signals, for example a cold start of GNSS may occupy thirty seconds or more. In some implementations, scheduling may choose a measurement time of around 1 to 60 seconds in the future depending on the type of measurement, amount of assistance data provided, environment, and required response time. In other applications, scheduling location measurements in the future may be used to improve location of one UE 110a relative to another UE 110b by ensuring both UEs are located at substantially the same time.

Note that the embodiments described above in association with FIGS. 1, 2a, 2b and 2c have focused on obtaining the location of each femtocell within a local group of femtocells using a minimum set of GNSS SV pseudo range measurements that may be made or scheduled at different times and another set of OTDOA and/or signal propagation time measurements between the femtocells. However, the method may also be applied to position methods other than GNSS. Thus, for example, the relative locations of femtocells within a group may be obtained as above using OTDOA or signal propagation time measurements by femtocells of other femtocells in the group. The absolute location and orientation of the group of femtocells may then be determined by a small number of measurements by some femtocells in the group of terrestrial radio beacons (e.g. radio beacons 108a-108b in FIG. 1). The measurements may include OTDOA measurements of pairs of radio beacons or measurements of signal propagation time from a radio beacon to an femtocell or signal strength measurements or other measurements. As in the case of GNSS pseudo range measurements, these measurements of terrestrial radio beacons may be made at more than one time and/or may be scheduled by a location server (e.g. location server 104 in FIG. 1). Allowing measurements at different times may allow femtocells that cannot always receive signals from certain radio beacons (e.g. due to temporary obstacles in the signal propagation path like road traffic and people) to make measurements as and when the radio beacons become visible which may increase the number of available measurements to the point where location of all femtocells in the group may be determined.

Furthermore, while the methods and embodiments herein have been applied to determining the location of femtocells within a local group of femtocells, substantially the same methods and embodiments may be used to locate any group of radio capable target devices where the target devices have generally fixed locations and are nearby to one another such that signals from one device can be received by others in the group. Examples of such static target devices include but are not limited to WiFi Access Points, Blue Tooth capable devices, wireless terminals associated with a group of static users (e.g. users sitting for some period within a conference room or office building), and pico base stations.

Note that the subsequent three paragraphs, FIG. 1, FIGS. 2a-2c and their corresponding descriptions provide means for means for identifying a plurality of static devices, means for obtaining location measurements by the plurality of static devices at different times, and means for determining locations of the plurality of static devices using the location measurements obtained at the different times. The subsequent three paragraphs, FIG. 1, FIGS. 2a-2c and their corresponding descriptions provide means for determining a group location of the plurality of static devices based on GNSS pseudo range measurements contributed by the one or more static devices, means for sharing a common time reference among the plurality of static devices, and means for determining the relative locations of the plurality of static devices using the location measurements made by one or more static devices in the plurality of static devices. The subsequent three paragraphs, FIG. 1, FIGS. 2a-2c and their corresponding descriptions provide means for scheduling a target time for obtaining location measurements, and means for synchronizing location measurements by the plurality of static devices according to the target time.

The methodologies described herein can be implemented by various means depending upon the application. For example, these methodologies can be implemented in hardware, firmware, software, or a combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof. Herein, the term "control logic" encompasses logic implemented by software, hardware, firmware, or a combination.

For a firmware and/or software implementation, the methodologies can be implemented with modules (e.g., procedures, functions, and so on) that perform the functions described herein. Any machine readable medium tangibly embodying instructions can be used in implementing the methodologies described herein. For example, software codes can be stored in a memory and executed by a processing unit. Memory can be implemented within the processing unit or external to the processing unit. As used herein the term "memory" refers to any type of long term, short term, volatile, nonvolatile, or other storage devices and is not to be limited to any particular type of memory or number of memories, or type of media upon which memory is stored.

If implemented in firmware and/or software, the functions may be stored as one or more instructions or code on a computer-readable medium. Examples include computer-readable media encoded with a data structure and computer-readable media encoded with a computer program. Computer-readable media may take the form of an article of manufacturer. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

The disclosure may be implemented in conjunction with various wireless communication networks such as a wireless wide area network (WWAN), a wireless local area network (WLAN), a wireless personal area network (WPAN), and so on. The terms "network" and "system" are often used interchangeably. The terms "position" and "location" are often used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a Long Term Evolution (LTE) network, a WiMAX (IEEE 802.16) network and so on. A CDMA network may implement one or more radio access technologies (RATs) such as cdma2000, Wideband-CDMA (W-CDMA), and so on. Cdma2000 includes IS-95, IS2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network. The techniques may also be implemented in conjunction with any combination of WWAN, WLAN and/or WPAN.

A mobile station refers to a device such as a cellular or other wireless communication device, personal communication system (PCS) device, personal navigation device (PND), Personal Information Manager (PIM), Personal Digital Assistant (PDA), laptop or other suitable mobile device which is capable of receiving wireless communication and/or navigation signals. The term "mobile station" is also intended to include devices which communicate with a personal navigation device (PND), such as by short-range wireless, infrared, wire line connection, or other connection—regardless of whether satellite signal reception, assistance data reception, and/or position-related processing occurs at the device or at the PND. Also, "mobile station" is intended to include all devices, including wireless communication devices, computers, laptops, etc. which are capable of communication with a server, such as via the Internet, Wi-Fi, or other network, and regardless of whether satellite signal reception, assistance data reception, and/or position-related processing occurs at the device, at a server, or at another device associated with the network. Any operable combination of the above are also considered a "mobile station."

Designation that something is "optimized," "required" or other designation does not indicate that the current disclosure applies only to systems that are optimized, or systems in which the "required" elements are present (or other limitation due to other designations). These designations refer only to the particular described implementation. Of course, many implementations are possible. The techniques can be used with protocols other than those discussed herein, including protocols that are in development or to be developed.

One skilled in the relevant art will recognize that many possible modifications and combinations of the disclosed embodiments may be used, while still employing the same basic underlying mechanisms and methodologies. The foregoing description, for purposes of explanation, has been written with references to specific embodiments. However, the illustrative discussions above are not intended to be exhaustive or to limit the disclosure to the precise forms disclosed. Many modifications and variations are possible in view of the above teachings. The embodiments were chosen and described to explain the principles of the disclosure and their practical applications, and to enable others skilled in the art to best utilize the disclosure and various embodiments with various modifications as suited to the particular use contemplated.

What is claimed is:

1. A method for determining locations of static devices, comprising:
   identifying a plurality of static devices by one or more processors supporting a device positioning module in an apparatus;
   obtaining location measurements by the plurality of static devices at different times using the one or more processors; and
   determining locations of the plurality of static devices using the location measurements obtained at the different times with the device positioning module supported by the one or more processors.

2. The method of claim 1, wherein obtaining location measurements comprises:
   obtaining GNSS pseudo range measurements for one or more satellite vehicles by one or more static devices in the plurality;
   obtaining Observed Time Difference Of Arrival (OTDOA) measurements for one or more fixed radio beacons;
   obtaining signal propagation time from one or more fixed radio beacons to one or more static devices in the plurality; or some combination thereof.

3. The method of claim 1, wherein determining locations of the plurality of static devices comprises:
   determining a group location of the plurality of static devices based on GNSS pseudo range measurements contributed by the one or more static devices.

4. The method of claim 3 wherein the group location is near a centroid of the plurality of static devices weighted by the number of GNSS pseudo range measurements contributed by each of the plurality of static devices.

5. The method of claim 1, wherein determining locations of the plurality of static devices further comprises:
   sharing a common time reference among the plurality of static devices.

6. The method of claim 1 further comprising:
   determining the relative locations of the plurality of static devices using the location measurements made by one or more static devices in the plurality of static devices.

7. The method of claim 6, wherein the location measurements made by one or more static devices in the plurality of static devices comprises:
   Observed Time Difference Of Arrival (OTDOA) measurements of pairs of static devices;
   signal propagation times between one or more pairs of static devices in the plurality of static devices; or some combination thereof.

8. The method of claim 1, further comprising:
   scheduling a target time for obtaining location measurements; and
   synchronizing location measurements by the plurality of static devices according to the target time.

9. The method of claim 8, wherein the target time comprises:
   a GNSS time;
   a local transmission time of one of the plurality of static devices;
   a local transmission time of a terrestrial radio beacon;
   a time relative to current time; or some combination thereof.

10. The method of claim 1, wherein at least one of the plurality of the static devices comprises a femtocell.

11. The method of claim 1, wherein at least one of the plurality of the static devices comprises a Wireless LAN Access Point.

12. An apparatus, comprising:
one or more processors;
a device positioning module, working with the one or more processors, includes logic for identifying a plurality of static devices;
logic for obtaining location measurements by the plurality of static devices at different times;
logic for determining locations of the plurality of static devices using the location measurements obtained at the different times; and
a memory configured to store locations of the plurality of static devices.

13. The apparatus of claim 12, wherein logic for obtaining location measurements comprises:
logic for obtaining GNSS pseudo range measurements for one or more satellite vehicles by one or more static devices in the plurality;
logic for obtaining Observed Time Difference Of Arrival (OTDOA) measurements for one or more fixed radio beacons;
logic for obtaining signal propagation time from one or more fixed radio beacons to one or more static devices in the plurality; or some combination thereof.

14. The apparatus of claim 12, wherein logic for determining locations of the plurality of static devices comprises:
logic for determining a group location of the plurality of static devices based on GNSS pseudo range measurements contributed by the one or more static devices.

15. The apparatus of claim 14 wherein the group location is near a centroid of the plurality of static devices weighted by the number of GNSS pseudo range measurements contributed by each of the plurality of static devices.

16. The apparatus of claim 12, wherein logic for determining locations of the plurality of static devices further comprises:
logic for sharing a common time reference among the plurality of static devices.

17. The apparatus of claim 12 further comprising:
logic for determining the relative locations of the plurality of static devices using the location measurements made by one or more static devices in the plurality of static devices.

18. The apparatus of claim 17, wherein the location measurements made by one or more static devices in the plurality of static devices comprises:
Observed Time Difference Of Arrival (OTDOA) measurements of pairs of static devices;
signal propagation times between one or more pairs of static devices in the plurality of static devices; or some combination thereof.

19. The apparatus of claim 12, further comprising:
logic for scheduling a target time for obtaining location measurements; and
logic for synchronizing location measurements by the plurality of static devices according to the target time.

20. The apparatus of claim 19, wherein the target time comprises:
a GNSS time;
a local transmission time of one of the plurality of static devices;
a local transmission time of a terrestrial radio beacon;
a time relative to current time; or some combination thereof.

21. The apparatus of claim 12, wherein the apparatus resides in a location server.

22. The apparatus of claim 12, wherein the apparatus resides in at least one of secure user plane location (SUPL) server, SUPL location platform server, and serving mobile location center.

23. A computer program product for determining locations of static devices, comprising a non-transitory medium storing computer programs for execution by one or more computer systems, the computer program product comprising:
code for identifying a plurality of static devices;
code for obtaining location measurements by the plurality of static devices at different times; and
code for determining locations of the plurality of static devices using the location measurements obtained at the different times.

24. The computer program product of claim 23, wherein code for obtaining location measurements comprises:
code for obtaining GNSS pseudo range measurements for one or more satellite vehicles by one or more static devices in the plurality;
code for obtaining Observed Time Difference Of Arrival (OTDOA) measurements for one or more fixed radio beacons;
code for obtaining signal propagation time from one or more fixed radio beacons to one or more static devices in the plurality; or some combination thereof.

25. The computer program product of claim 23, wherein code for determining locations of the plurality of static devices comprises:
code for determining a group location of the plurality of static devices based on GNSS pseudo range measurements contributed by the one or more static devices.

26. The computer program product of claim 25 wherein the group location is near a centroid of the plurality of static devices weighted by the number of GNSS pseudo range measurements contributed by each of the plurality of static devices.

27. The computer program product of claim 23, wherein code for determining locations of the plurality of static devices further comprises:
code for sharing a common time reference among the plurality of static devices.

28. The computer program product of claim 23 further comprising:
code for determining the relative locations of the plurality of static devices using the location measurements made by one or more static devices in the plurality of static devices.

29. The computer program product of claim 28, wherein the location measurements made by one or more static devices in the plurality of static devices comprises:
Observed Time Difference Of Arrival (OTDOA) measurements of pairs of static devices;
signal propagation times between one or more pairs of static devices in the plurality of static devices; or some combination thereof.

30. The computer program product of claim 23, further comprising:
code for scheduling a target time for obtaining location measurements; and
code for synchronizing location measurements by the plurality of static devices according to the target time.

31. The computer program product of claim 30, wherein the target time comprises:
a GNSS time;
a local transmission time of one of the plurality of static devices;
a local transmission time of a terrestrial radio beacon;
a time relative to current time or some combination thereof.

32. The computer program product of claim 23, wherein at least one of the plurality of the static devices comprises a femtocell.

33. A system for determining locations of static devices, comprising:
   means for identifying a plurality of static devices;
   means for obtaining location measurements by the plurality of static devices at different times; and
   means for determining locations of the plurality of static devices using the location measurements obtained at the different times.

34. The system of claim 33, wherein means for determining locations of the plurality of static devices comprises:
   means for determining a group location of the plurality of static devices based on GNSS pseudo range measurements contributed by the one or more static devices.

35. The system of claim 33, wherein means for determining locations of the plurality of static devices further comprises:
   means for sharing a common time reference among the plurality of static devices.

36. The system of claim 33 further comprising:
   means for determining the relative locations of the plurality of static devices using the location measurements made by one or more static devices in the plurality of static devices.

37. The system of claim 33, further comprising:
   means for scheduling a target time for obtaining location measurements; and
   means for synchronizing location measurements by the plurality of static devices according to the target time.

* * * * *